May 13, 1930.  C. M. STEIN  1,758,180

DEMOUNTABLE ROTARY CRUSHER

Filed March 18, 1925

INVENTOR.
Charles M. Stein,
By O'Neill and Bunn
ATTORNEYS.

Patented May 13, 1930

1,758,180

UNITED STATES PATENT OFFICE

CHARLES M. STEIN, OF PARIS, FRANCE, ASSIGNOR TO SOCIÉTÉ ANONYME "LA COMBUSTION" RATIONNELLE, OF PARIS, FRANCE, A CORPORATION OF FRANCE

DEMOUNTABLE ROTARY CRUSHER

Application filed March 18, 1925, Serial No. 16,586, and in France January 5, 1925.

The invention has for its subject matter a number of arrangements which permit of ensuring, by simple means, the driving of the motor shaft of a wheel or disc carrying the working elements of a rotary pulverizer. One of the objects of the invention is the provision of means facilitating the act of demounting and replacing the crushing wheel in one operation or in a small number of operations. At the same time these arrangements ensure efficient protection to the motor shaft against excessive resistance borne by the crushing elements. Other objects of the invention will be made apparent in the following specification, when read in connection with the accompanying drawings forming a part thereof.

In order to realize these objects consideration is first given to an arrangement shown in Figures 1 and 2 in the annexed drawings. In said drawings.

Figure 2:
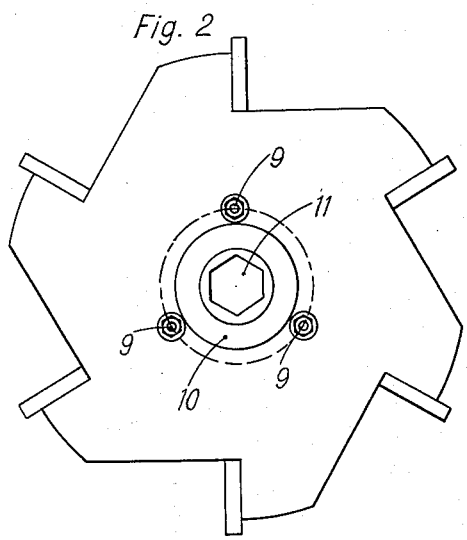
Figure 2 is an end elevation.

On the figures, 1 is the motor shaft which drives at its end the crushing apparatus. 2 is a hub keyed at 3 on the shaft and abutting against the shoulder 4 on the said shaft. The hub 2 is provided on its periphery with a number of recesses 5, generally three. The hub 2 is extended to form a cylindrical sleeve 6 on which is exactly centered the corresponding core of the disc 7 carrying the crushing elements, the said core being of conical formation externally. The disc 7 of the pulverizer is provided in accordance with the hub 2 with a similar number of holes as the said hub, but the said holes are of smaller diameter. Bolts 9 are equivalent of two different diameters and of a number corresponding to that of the holes, are clamped against the disc 7 by a nut and lock nut so that the larger diameter parts of the bolts form axes which are enclosed without play in hard steel sockets 5 mounted on the driving hub 2. From approximately the end of the key seat on the shaft 1 the latter is reduced in diameter and is screw threaded, the pitch of the said screw being of a fine nature. A nut 10 is adapted to screw onto the fine threaded part of the shaft 1 and the direction of the thread thereon is such that the nut by its inertia has a tendency to lock or jam itself during the rotation of the shaft 1. The outer end of the nut is provided with a recess of square, hexagonal or other suitable form so as to allow of the insertion of the key to effect removal of the nut. On the face opposed to the nut 10 is provided a circular recess 12 and the outer face of this recess is turned conical as shown at 8 with a slope corresponding to the slope on the external surface of the cylindrical extension 6 on the hub 2.

It is clear from the foregoing that at or about the end of the operation of screwing the nut 10 onto the screw threaded end of the shaft 1, the interior cone of the nut will come gradually into contact with the cone on the hub and that on this contact being effected, a slight additional effort on the key will ensure definite clamping or locking by wedging of the two conical surfaces one into the other.

It is obvious that by positioning the single nut 10 or by demounting it, the crusher wheel 7 is consequently retained in position or released, the bolts 9 being thereby released from their sockets.

The small section of the bolts 9, their number and their distance from the driving shaft are provided with the view of resisting the efforts corresponding to the normal work of crushing. If, in consequence, of overloading or of the introduction of foreign bodies into the machine or for any other cause an excessive resistance is opposed to the action of the crusher, the bolts 9 become sheared at their weakest section and the crushing disc 7 is rendered stationary on its core 6. A minimum play is provided at 13 between the face of the nut 10 when screwed home and the disc 7 in order to avoid direct clamping of the disc 7 on the hub 2, such clamping being liable to cause driving of the crusher after rupture of the safety bolts 9.

Figure 1:
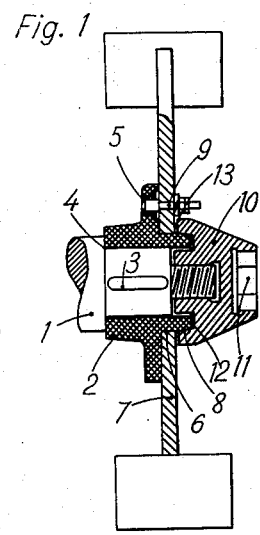
Figure 1 is a longitudinal section through the axis of the motor shaft.
Figure 3:
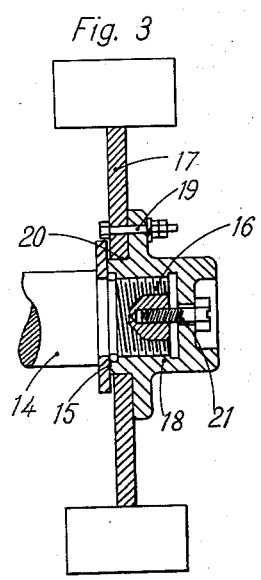
Fig. 3 is a view similar to Fig. 1, showing a modified form of the invention, and, Fig. 4 is a similiar view of another modification.

Figure 3 shows in longitudinal section a constructional modification in accordance with the present invention. In this figure, 14 is the main shaft which is provided with a shoulder 15 which is rigid with the shaft and formed by a washer attached thereto. The shaft 14 is provided with a screw threaded end 16 the said thread being of fine pitch. The disc 17 of the crusher wheel is connected to the hub 18 by bolts 19, the number and section of the said bolts being predetermined to meet the requirements of the machine in a similar manner to the bolts 9. Either type of safety bolt may be employed that is to say, the stud bolt shown at 9 in Figure 1 or the ordinary bolt shown at 19, Figure 3. The hub 18 is screw threaded to agree with the screw thread on the shaft as at 16 and the said hub abuts against the shoulder 15 without clamping the disc on the said shoulder. In case of rupture of the driving bolts 19 the disc 17 becomes stationary on the cylindrical part 20 of the hub 18. A set screw 21 is screwed through the bottom of the hub 18 and screws into the end and centrally of the screw threaded part 16 of the shaft. Such set screw acts to oppose unclamping of the hub by reason of the difference in pitch of the set screw thread and of the screw thread on the hub 18 and the part 16 of the shaft. The screw threaded part 16 and the screw thread 21 are preferably of opposite direction so as to prevent unclamping of the cooperating parts.

It will be seen that on unscrewing the set screw 21 it is sufficient to turn the screw 16 in the desired direction in order to unscrew the hub 18 and the shaft is then ready to receive an interchangeable wheel or disc such as 17 which can be placed in position by reversing the operation hereinbefore described.

Figure 4:
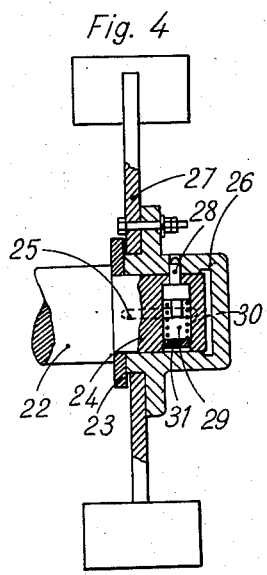

Figure 4 shows in longitudinal section a further constructional form in accordance with the invention. The motor shaft 22 is provided with a ring 23 and an end 24 having a key seat and a key 25 therein. A hub 26 is mounted on the end 24 of the shaft so as to abut against the ring 23, the said hub being adapted to drive a disc 27 by any of the means such as hereinbefore described. The hub 26 which is driven by the key 25 cannot be displaced along the shaft because of the presence of a pin 28 situated in a hole 29 in the shaft end 24, the end of which pin engages in a corresponding hole in the hub 26. A spring 30 is provided which bears at one end on a plug 31 and at the other end on an enlarged portion of the pin 28 and thereby ensures the engagement of the pin 28 in the corresponding hole in the hub 26 so that accidental displacement of the pin 28 is impossible.

In order to demount it, it is sufficient to disengage the pin 28 from the hole in the hub 26 and to slide the hub from the shaft, the latter being then ready to receive another disc or wheel in exchange or in lieu of the wheel or disc previously on the shaft.

I claim—

1. In a demountable mounting for rotary crushers, a drive shaft, a hub detachably mounted on the drive shaft, a drive connection operatively connecting the hub to the shaft, a rotary crusher mounted on said hub, a shearable drive connection between the hub and the crusher, and means for preventing axial displacement of the hub on the shaft.

2. In the structure defined in claim 1, the axial displacement preventing means including a spring pressed pin mounted in the shaft and an opening in the hub for normally receiving said pin for preventing axial movement of the hub.

In testimony whereof I affix my signature.

CHARLES M. STEIN.